US010740937B1

(12) United States Patent
Sharma et al.

(10) Patent No.: US 10,740,937 B1
(45) Date of Patent: Aug. 11, 2020

(54) FREEFORM GRADIENT STYLE TRANSFER (71) Applicant: Adobe Inc., San Jose, CA (US)

(72) Inventors: Avadhesh Kumar Sharma, Jhunjhunu (IN); Tarun Tandon, Noida (IN); Nitika Bansal, Ludhiana (IN)

(73) Assignee: Adobe Inc., San Jose, CA (US)

( * ) Notice: Subject to any disclaimer, the term of this patent is extended or adjusted under 35 U.S.C. 154(b) by 6 days.

(21) Appl. No.: 16/281,551

(22) Filed: Feb. 21, 2019

(51) Int. Cl.
*G06T 11/00* (2006.01)
*G06T 11/40* (2006.01)
*G06T 7/90* (2017.01)
*G06T 7/60* (2017.01)
*G09G 5/02* (2006.01)

(52) U.S. Cl.
CPC .............. *G06T 11/40* (2013.01); *G06T 7/60* (2013.01); *G06T 7/90* (2017.01); *G06T 11/001* (2013.01)

(58) Field of Classification Search
CPC combination set(s) only.
See application file for complete search history.

(56) References Cited

U.S. PATENT DOCUMENTS

| | | | |
|---|---|---|---|
| 6,784,896 B1 * | 8/2004 | Perani | G06T 11/001 345/423 |
| 8,411,080 B1 * | 4/2013 | Zimmermann | G06T 19/20 345/419 |
| 8,787,698 B2 * | 7/2014 | Winnemoeller | G06T 11/001 345/156 |
| 10,489,946 B1 * | 11/2019 | Batra | H04N 1/603 |
| 2008/0316202 A1 * | 12/2008 | Zhou | G06T 17/20 345/419 |
| 2013/0127856 A1 * | 5/2013 | Winnemoeller | G06T 11/001 345/423 |
| 2017/0139204 A1 * | 5/2017 | Pauly | G01N 21/4133 |
| 2018/0012407 A1 * | 1/2018 | Chuang | G06T 7/75 |
| 2019/0087980 A1 * | 3/2019 | Phogat | G06T 11/001 |

* cited by examiner

Primary Examiner — Wesner Sajous
(74) Attorney, Agent, or Firm — SBMC (57) ABSTRACT

In implementations of freeform gradient style transfer, a style transfer system transfers a style of a freeform gradient of a source geometry of an object to a target geometry of an additional object. The system adds source mesh handles to a boundary of a source mesh of the object, and the system also adds target mesh handles to a boundary of a target mesh of the additional object. The source mesh handles are mapped to the target mesh handles, and the system warps the source mesh to appear as the target mesh based on the mapping. Color point locations of the freeform gradient are mapped from the source mesh to the warped source mesh to transfer the freeform gradient style from the source geometry of the object to the target geometry of the additional object.

20 Claims, 10 Drawing Sheets
(7 of 10 Drawing Sheet(s) Filed in Color)

302
Generate source mesh handles on a boundary of a source mesh of a source geometry, the source mesh including color point locations of a freeform gradient of the source geometry

304
Generate target mesh handles on a boundary of a target mesh of a target geometry

306
Map the source mesh handles to the target mesh handles by coinciding a geometric center of the source geometry and a geometric center of the target geometry

308
Warp the source mesh and the color point locations based on the mapping to generate a freeform gradient of the target geometry having a style of the freeform gradient of the source geometry

310
Render the freeform gradient of the target geometry having the style in a user interface

FREEFORM GRADIENT STYLE TRANSFER

BACKGROUND

In digital drawing and painting systems, a gradient is generally a blending of colors or shades of colors which is rendered in a user interface. Conventional systems can render gradients for use as colorful backgrounds, special effects, project themes, presentation styles, etc. Some types of gradients can be designed as a digital asset which may be used to apply the gradient, for example, to fill geometries of various digital objects. In this manner, conventional systems enable a digital artist to design a gradient such as a by manipulation of color points which control the colors of the gradient, and then the gradient design can be applied to many other objects. This allows the digital artist to propagate the gradient design across multiple objects quickly and efficiently.

Freeform gradients are a type of gradient that can be used to create a blend of colors within a geometry of an object in an ordered or random sequence such that the blending appears smooth and natural. These gradients are created by arranging color points on a mesh of an object. Each color point has an associated color value, and conventional systems use the color values to interpolate colors to generate the freeform gradients within the geometry of the object. However, freeform gradients are object specific and therefore cannot be applied to other objects as is the case with linear and radial gradients. This is frustrating to digital artists as they must attempt to recreate a freeform gradient of a source object in a target object to transfer a style of the freeform gradient from the source object to the target object. Accordingly, the inability to transfer freeform gradient styles among digital objects presents a technological problem in the field of digital drawing and painting.

SUMMARY

Systems and techniques are described for freeform gradient style transfer. A computing device implements a style transfer system which receives a source geometry of an object having a freeform gradient and a target geometry of an additional object as inputs. The freeform gradient has a style defined by orientations of color point locations within the source geometry of the object. The system adds source mesh handles to a boundary of a source mesh of the object, and the system also adds target mesh handles to a target mesh of the additional object. The system also preserves the color point locations of the source mesh.

The source mesh handles are mapped to the target mesh handles, and the system warps the source mesh to appear as the target geometry based on the mapping. The preserved color point locations of the source mesh are mapped to the warped source mesh and a freeform gradient having the style is generated based on this mapping. By warping the source mesh to appear as the target geometry and mapping the preserved color point locations to the warped source mesh, the system transfers the style of the freeform gradient of the source geometry of the object to the target geometry of the additional object.

The described systems improve digital drawing and painting by technology by enabling freeform gradient style transfer from a source geometry to a target geometry even in cases where the source and target geometries have no features in common. Furthermore, the system is capable of implementing a style of a freeform gradient as a reusable digital asset which can be applied to any geometry of a digital object. This eliminates the tedious effort involved in recreating the style of the freeform gradient each time the style is applied to a geometry of an object, and the reusable digital asset can be modified to modify the style of freeform gradients applied to many geometries of objects automatically. Additionally, by facilitating freeform gradient style transfer, the described systems provide functionality that was previously not possible.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures may be indicative of one or more entities and thus reference may be made interchangeably to single or plural forms of the entities in the discussion.

FIGS. 4A, 4B, 4C, 4D, and 4E are illustrations depicting an example representation in which a style of a freeform gradient of a source geometry is transferred to a target geometry.

DETAILED DESCRIPTION

Overview

Broadly, a gradient is a blending of colors or shades of colors which is rendered in a user interface on a display device. Conventional systems can render gradients for use as backgrounds, special effects, project themes, presentation styles, etc. Some types of gradients can be designed as a digital asset which may be used to apply the gradient, for example, to fill geometries of various digital objects. In this manner, conventional systems enable a digital artist to design a gradient such as a by manipulation of color points which control the colors of the gradient, and then the gradient design can be applied to many other objects. This allows the digital artist to propagate the gradient design across multiple objects quickly and efficiently.

Freeform gradients are a type of gradient that can be used to create a blend of colors within a geometry of an object in an ordered or random sequence such that the blending appears smooth and natural. These gradients are created by arranging color points on a mesh of an object. Each color point has an associated color value, and conventional systems use the color values to interpolate colors to generate the freeform gradients within the geometry of the object. In this manner, freeform gradients are object specific and therefore cannot be applied to other objects as is the case with other types of gradients such as linear and radial gradients. This is frustrating to digital artists as they must attempt to recreate a style of a freeform gradient of a source object in a target object to transfer the style of the freeform gradient to the target object. Accordingly, the inability to transfer freeform gradient styles among digital objects presents a technological problem in the field of digital drawing and painting.

To overcome these problems, techniques are described that support freeform gradient style transfer within a digital medium environment. In accordance with the described techniques, a computing device implements a style transfer system which receives a source geometry of an object having a freeform gradient and a target geometry of an additional object as inputs. The freeform gradient has a style defined by orientations of color point locations within the source geometry of the object.

The style transfer system includes a meshing module, a mesh handle module, a mapping module, and a warping module. The meshing module is implemented to add anchor points to the source geometry and the target geometry, and then generate a source mesh of the object and a target mesh of the additional object. The addition of the anchor points causes both the source mesh and the target mesh to have more path segments which increases precision in mesh deformation. The meshing module adds the anchor points such that the source mesh and the target mesh have the same number of anchor points to ensure one-to-one correspondence between the meshes. Color point locations of the source mesh are also identified and the meshing module preserves mesh indices associated with the color point locations of the source mesh.

The mesh handle module is implemented to sample points around a boundary of the source mesh and sample points around a boundary of the target mesh. Based on the sampled points, the mesh handle module adds mesh handles to the source mesh boundary and the target mesh boundary. These mesh handles are added to the meshes such that the source mesh and the target mesh have an equal number of mesh handles to facilitate a one-to-one mapping between mesh handles of the two meshes.

The mapping module is implemented to map the mesh handles of the source mesh to the mesh handles of the target mesh. To accomplish this, the mapping module coincides a geometrical center of the source mesh and a geometrical center of the target mesh and maps an initial mesh handle of the source mesh to an initial mesh handle of the target mesh and the initial mesh handle of the source mesh is modified to have the position of the corresponding initial mesh handle of the target mesh. The mapping module continues mapping the source mesh handles to the target mesh handles in this way until each of the mesh handles of the source mesh have the position of the corresponding mesh handle of the target mesh.

The warping module is implemented to warp the source mesh based on the mesh handle mapping so that the warped source mesh appears as the target geometry. The color point locations are mapped, e.g., by the mapping module, to the warped source mesh based on the preserved mesh indices and a freeform gradient is generated based on the mapped color point locations. In this way, the style transfer system transfers the freeform gradient style of the source geometry of the object to the target geometry of the additional object.

The described systems improve digital drawing and painting by technology by enabling freeform gradient style transfer from a source geometry to a target geometry even in cases where the source and target geometries have no features in common. Furthermore, the system is capable of implementing a style of a freeform gradient as a reusable digital asset which can be applied to any geometry of a digital object. This eliminates the tedious effort involved in recreating the style of the freeform gradient each time the style is applied to a geometry of an object, and the reusable digital asset can be modified to modify the style of freeform gradients applied to many geometries of objects automatically. Additionally, by facilitating freeform gradient style transfer, the described systems provide functionality that was previously not possible.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
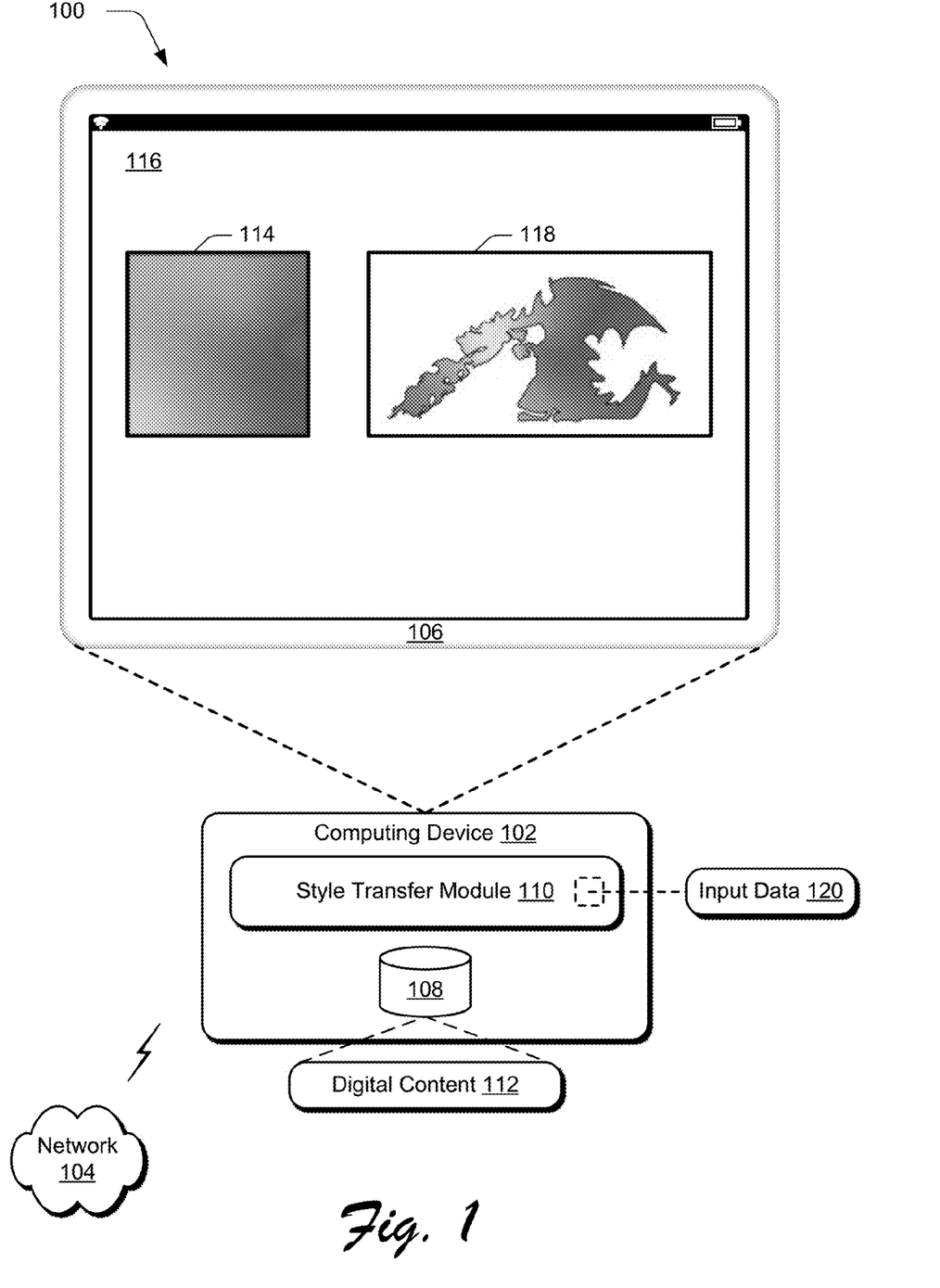
FIG. 1 is an illustration of an environment in an example implementation that is operable to employ digital systems and techniques as described herein.

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a style transfer module 110. The storage device 108 is illustrated to include digital content 112.

An example of the digital content 112 is a freeform gradient applied to a geometry of an object 114 which is displayed in a user interface 116 on the display device 106. This freeform gradient has a style defined by orientations of color points within the object's 114 geometry. In an example, the freeform gradient style of the object 114 is transferable to another object which is illustrated as a freeform gradient having the style applied to a geometry of an additional object 118 that is also displayed in the user interface 116. In particular, the geometry of the object 114 is different than the geometry of the additional object 118. In this example, the freeform gradient style is applied to a square-shaped geometry of the object 114, and the freeform gradient style is transferred to a dragon-shaped geometry of the additional object 118.

Aspects of the freeform gradient style as applied to the geometry of the object 114 may be included in input data 120. The style transfer module 110 is illustrated as having, receiving, and/or transmitting input data 120. For example, the computing device 102 may implement the style transfer module 110 to receive the input data 120 which can include the style of the freeform gradient applied to the geometry of the object 114 as well as the geometry of the additional object 118, and the style transfer module 110 can process the input data 120 to transfer the style of the freeform gradient from the square-shaped geometry of the object 114 to the dragon-shaped geometry of the additional object 118.

In one example, the style of the freeform gradient applied to the geometry of the object 114 may be included within the system 100 as digital content 112. In this manner, the style of the freeform gradient can be a digital asset that is usable to apply the style of the freeform gradient to the geometry of the additional object 118. In this example, the input data 120 may only include the geometry of the additional object 118, and the style transfer module 110 is implemented to transfer the freeform gradient style of the object 114 to the additional object 118 by transferring the style from a reusable digital asset to the additional object 118.

Figure 2:
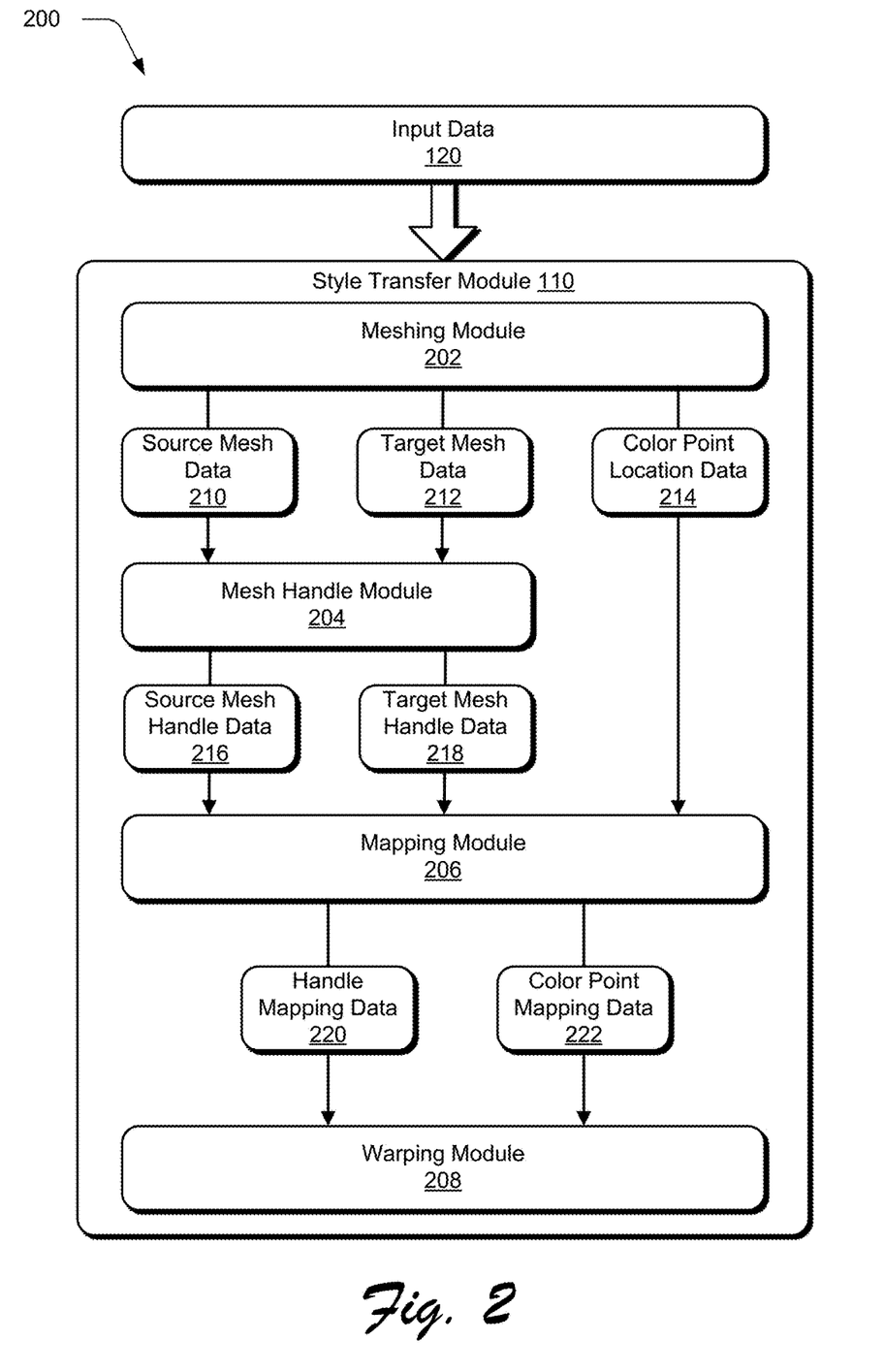
FIG. 2 depicts a system in an example implementation showing operation of a style transfer module.

FIG. 2 depicts a system 200 in an example implementation showing operation of a style transfer module 110. The style transfer module 110 is illustrated to include a meshing module 202, a mesh handle module 204, a mapping module 206, and a warping module 208. The computing device 102 implements the style transfer module 110 to receive input data 120, e.g., the style transfer module 110 may receive the input data 120 over the network 104 or based on user inputs received by the computing device 102 via the user interface 116. In one or more implementations, the meshing module 202 may receive the input data 120 and the meshing module 202 may process the input data 120 as source mesh data 210, target mesh data 212, and color point location data 214. For example, the meshing module 202 may receive the freeform gradient applied to the geometry of the object 114 as part of receiving the input data 120, and the meshing module 202 is implemented to generate a source mesh of the object 114 which is represented by the source mesh data 210. In an example, the meshing module 202 is implemented to add anchor points to the source mesh of the object 114 because adding these anchor points will create more path segments of the source mesh. As a result the additional path segments, the source mesh may be warped with greater precision.

In one or more implementations, the input data 120 may include the geometry of the additional object 118. For example, the meshing module 202 can receive the geometry of the additional object 118 as part of receiving the input data 120, and the meshing module 202 is implemented to generate a target mesh of the additional object 118 which is represented by the target mesh data 212. In one example, the meshing module 202 is implemented to add anchor points to the target mesh of the additional object 118 to increase warping precision. In another example, the meshing module 202 is implemented to add anchor points to the source mesh of the object 114 and target mesh of the additional object 118 such that the source mesh and the target mesh have the same fixed number of anchor points. In this manner, the meshing module 202 prepares the source mesh and the target mesh for processing by the mesh handle module 204.

In an example, the input data 120 may include locations of color points of the freeform gradient applied to the geometry of the object 114. The meshing module 202 can receive the locations of the color points of the freeform gradient of the object 114 as part of receiving the input data 120, and the meshing module 202 is implemented to preserve vertex indices for color points of the source mesh of the object 114 which is represented as the color point location data 214.

The mesh handle module 204 is illustrated as receiving the source mesh data 210 and the target mesh data 212. In one or more implementations, the mesh handle module 204 receives the source mesh data 210 and the target mesh data 212 as inputs, and the mesh handle module 204 is implemented to process the inputs as source mesh handle data 216 and target mesh handle data 218. For example, the mesh handle module 204 is implemented to process the source mesh data 210 to add mesh handles to the source mesh which is represented as the source mesh handle data 216. The source mesh data 210 describes the source mesh of the object 114 having the additional anchor points and the target mesh data 212 describes the target mesh of the additional object 118 also having the additional anchor points. For example, the mesh handle module 204 may receive the source mesh data 210, and the mesh handle module 204 is implemented to sample boundary points of the geometry of the object 114. In an example, the mesh handle module 204 may receive the target mesh data 212, and the mesh handle module 204 is implemented to sample boundary points of the geometry of the additional object 118.

In one or more implementations, the mesh handle module 204 is implemented to determine a starting segment as the first segment index to sample to get one-to-one correspondence between the source mesh and the target mesh. For example, the mesh handle module 204 is implemented to add mesh handles on the sampled boundary points of the geometry of the object 114. In one example, the mesh handle module 204 can be implemented to determine mesh index positions of the color point locations of the freeform gradient of the geometry of the object 114. In this example, the mesh handle module 204 is implemented to analyze each closed loop of segments of the source mesh of the object 114. For example, the source mesh of the object 114 may be a triangle mesh, so in this example, the mesh handle module 204 is implemented to analyze each triangle of the source mesh and return the triangle index if a color point is in the triangle or return the nearest triangle index from the color point position such as by calculating a distance of the color point from the triangle.

In an example, the mesh handle module 204 is implemented to add mesh handles on the sampled boundary points of the geometry of the object 114 and the sampled boundary points of the geometry of the additional object 118. In one example, the geometry of the additional object 118 with added mesh handles is represented as the target mesh handle data 218. In this manner, the mesh handle module 204 adds the mesh handles to the source mesh and the target mesh so that the meshes have the same number of mesh handles to facilitate a one-to-one mapping between the mesh handles of the source mesh and the mesh handles of the target mesh. For example, the mesh handle module 204 is implemented to determine a mesh handle of the first segment index to start sampling as a starting mesh handle to perform the one-to-one mapping. In one or more implementations, the starting mesh handle to perform the one-to-one mapping is included as part of the source mesh handle data 216.

The mapping module 206 is illustrated as receiving the source mesh handle data 216, the target mesh handle data 218, and the color point location data 214. For example, the mapping module 206 receives the source mesh handle data 216, the target mesh handle data 218, and the color point location data 214 as inputs, and the mapping module 206 is implemented to process the inputs as handle mapping data 220 and color point mapping data 222. In an example, the mapping module 206 may be configured to add the mesh handles to the target mesh of the additional object 118.

In one or more implementations, the mapping module 206 receives the source mesh handle data 216 and the target mesh handle data 218, and the mapping module 206 is implemented to map the mesh handles of the source mesh of the object 114 to the mesh handles of the target mesh of the additional object 118. In this way, the mapping module 206 is configured to coincide a geometric center of the geometry of the object 114 with a geometric center of the geometry of the additional object 118, and then map the mesh handles of the source mesh to the mesh handles of the target mesh by a one-to-one mapping. As a result, the mapping module 206 translates the geometry of the object 114 to the geometry of the additional object 118 such that the mesh handles of the source mesh are modified to have a position of the corresponding mesh handles of the target mesh which is represented as the handle mapping data 220.

In an example, the mapping module 206 receives the color point location data 214, and the mapping module 206 is implemented to map the color point locations based on the modified source mesh positions and the mesh index positions of the color point locations of the freeform gradient of the geometry of the object 114. This color point location mapping is represented as the color point mapping data 222. In one example, the color point mapping data 222 describes color point positions of the source mesh after the source mesh is warped based on the handle mapping data 220.

The warping module 208 is illustrated as receiving the handle mapping data 220 and the color point mapping data 222 as inputs, and the warping module 208 is implemented to process the inputs to warp the source mesh to the target mesh and map the color point positions to the warped source mesh to transfer the style of the freeform gradient of the object 114 to the additional object 118 as a freeform gradient having the style. In this way, the warping module 208 warps the geometry of the object 114 to appear as the geometry of the additional object 116 based on the handle mapping data 220, and the warping module 208 maps the color point locations from the preserved indexes of the source mesh to corresponding indexes of the warped source mesh to transfer the style of the freeform gradient of the object 114 to the additional object 118. As a result, the style transfer module 110 receives the input data 120 which can include the style of the freeform gradient applied to the geometry of the object 114 as well as the geometry of the additional object 118, and the style transfer module 110 can process the input data 120 to transfer the style of the freeform gradient from the square-shaped geometry of the object 114 to the dragon-shaped geometry of the additional object 118.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

Figure 3:
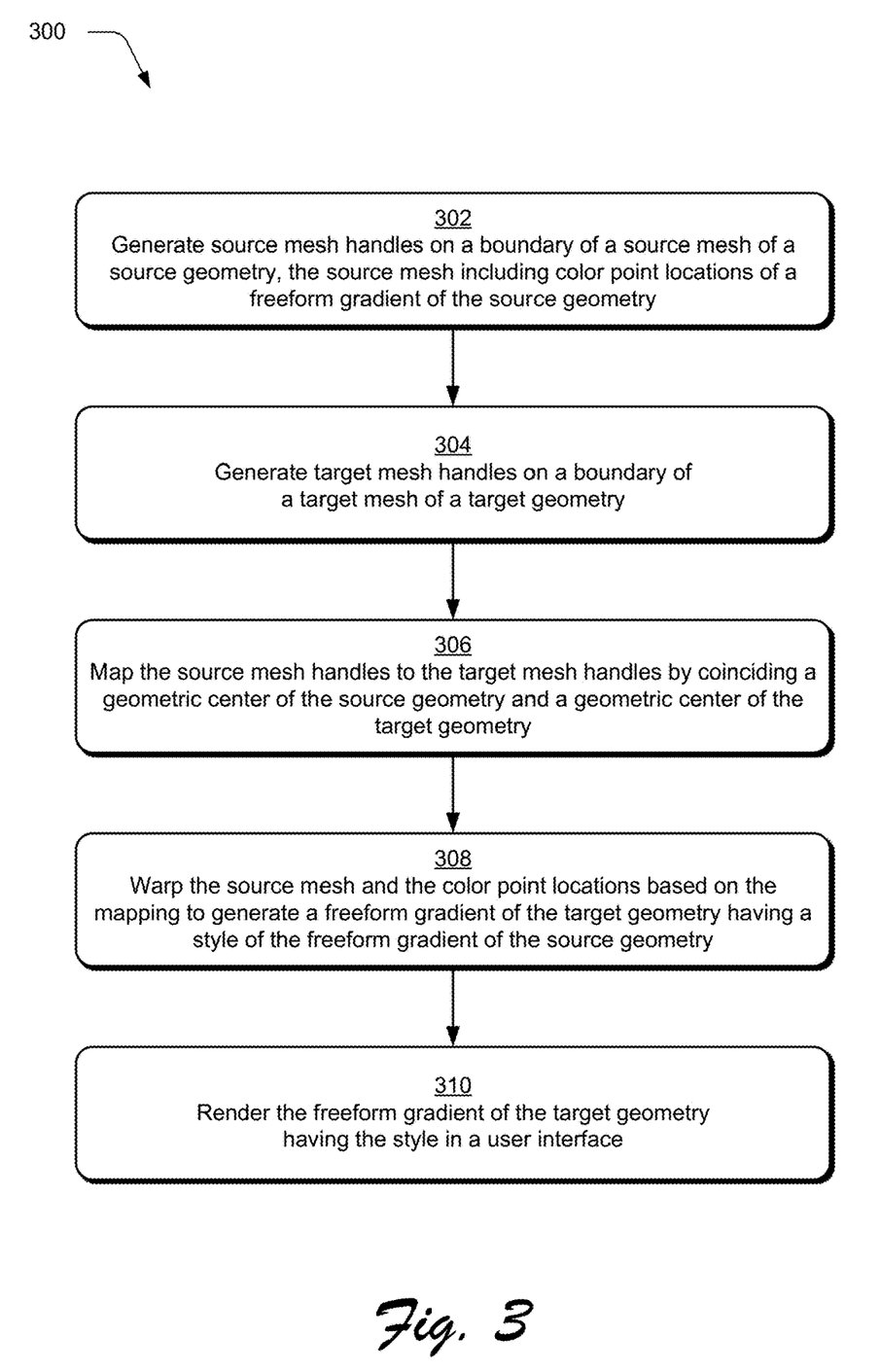
FIG. 3 is a flow diagram depicting a procedure in an example implementation in which a style of a freeform gradient of a source geometry is transferred to a target geometry.

FIG. 3 is a flow diagram depicting a procedure 300 in an example implementation in which a style of a freeform gradient of a source geometry is transferred to a target geometry. Source mesh handles are generated on a boundary of a source mesh of a source geometry, and the source mesh includes color point locations of a freeform gradient of the source geometry (block 302). Target mesh handles are generated on a boundary of a target mesh of a target geometry (block 304). For example, the mesh handle module 204 generates the source mesh handles on the boundary of the source mesh, and the mesh handle module 204 also generates the target mesh handles on the boundary of the target mesh. The source mesh handles are mapped to the target mesh handles by coinciding a geometric center of the source geometry and a geometric center of the target geometry (block 306). In an example, the mapping module 206 maps the source mesh handles to the target mesh handles. The source mesh and the color point locations are warped based on the mapping to generate a freeform gradient of the target geometry having a style of the freeform gradient of the source geometry (block 308). In one example, the warping module 208 warps the source mesh and the color point locations to generate the freeform gradient of the target geometry having the style of the source geometry. The freeform gradient of the target geometry having the style is rendered in a user interface (block 310). In one or more implementations, the computing device 102 renders the freeform gradient of the target geometry in the user interface 116 on the display device 106.

Freeform Gradient Style Transfer

Figure 4A:
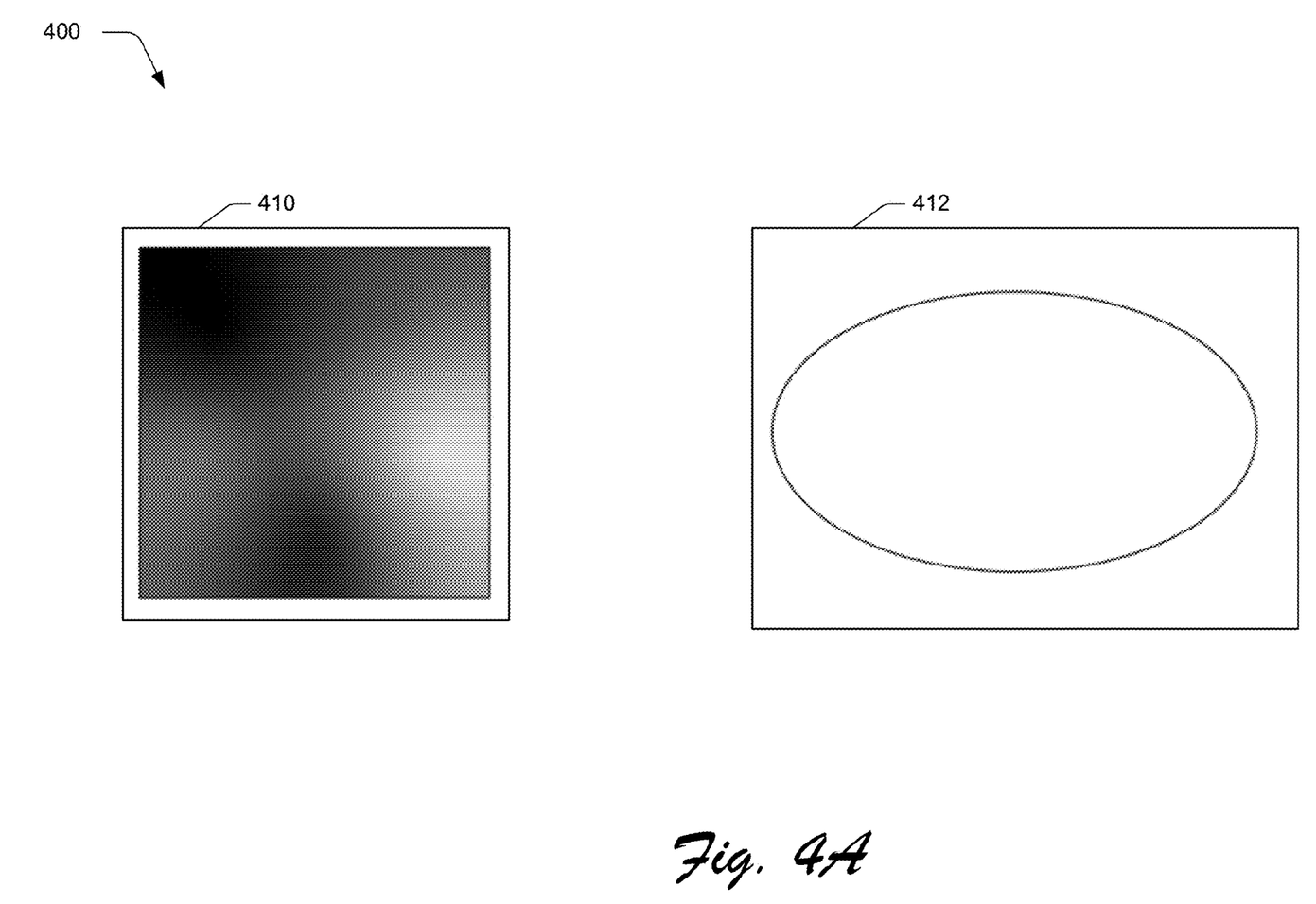
Figure 4B:
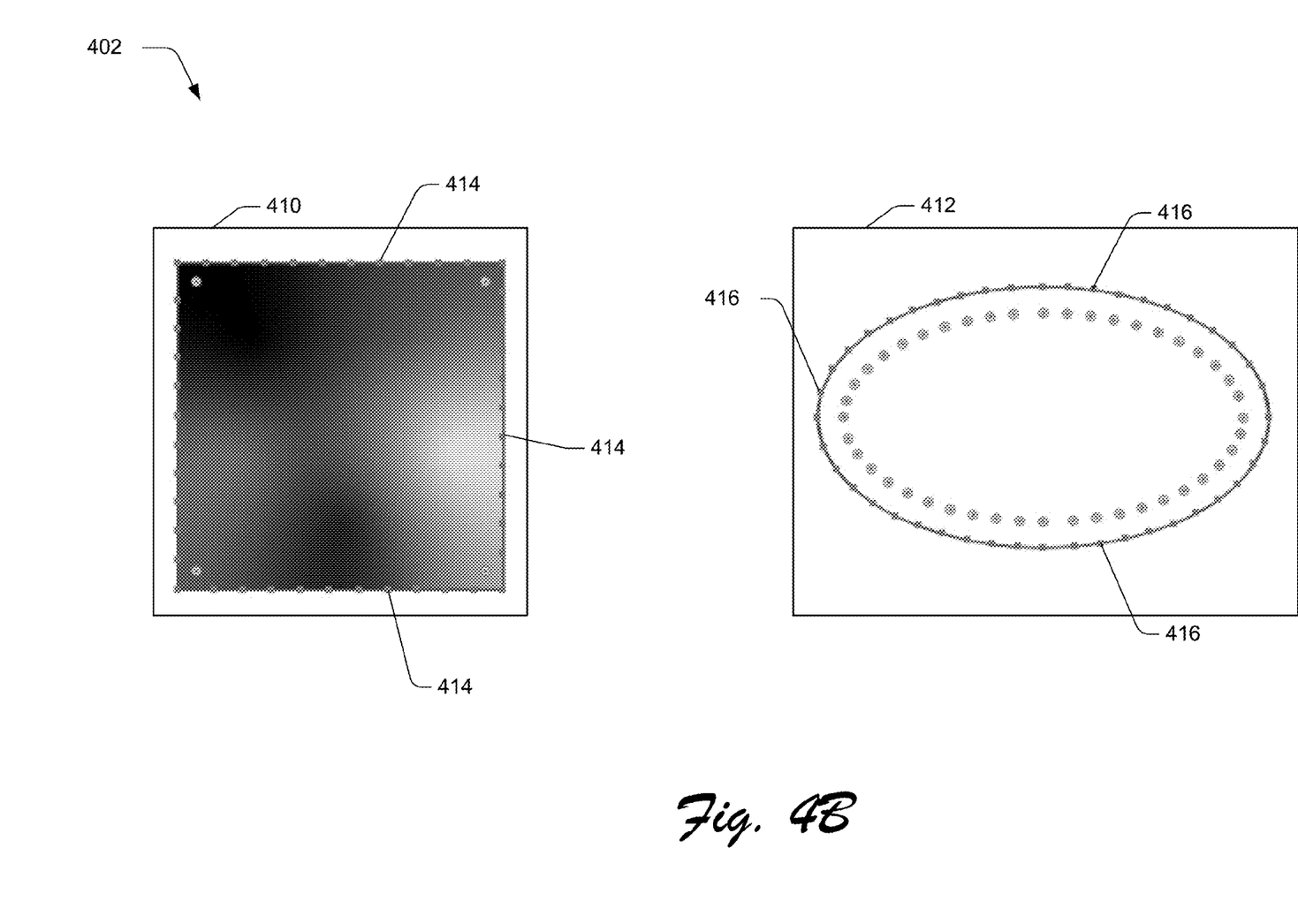
Figure 4C:
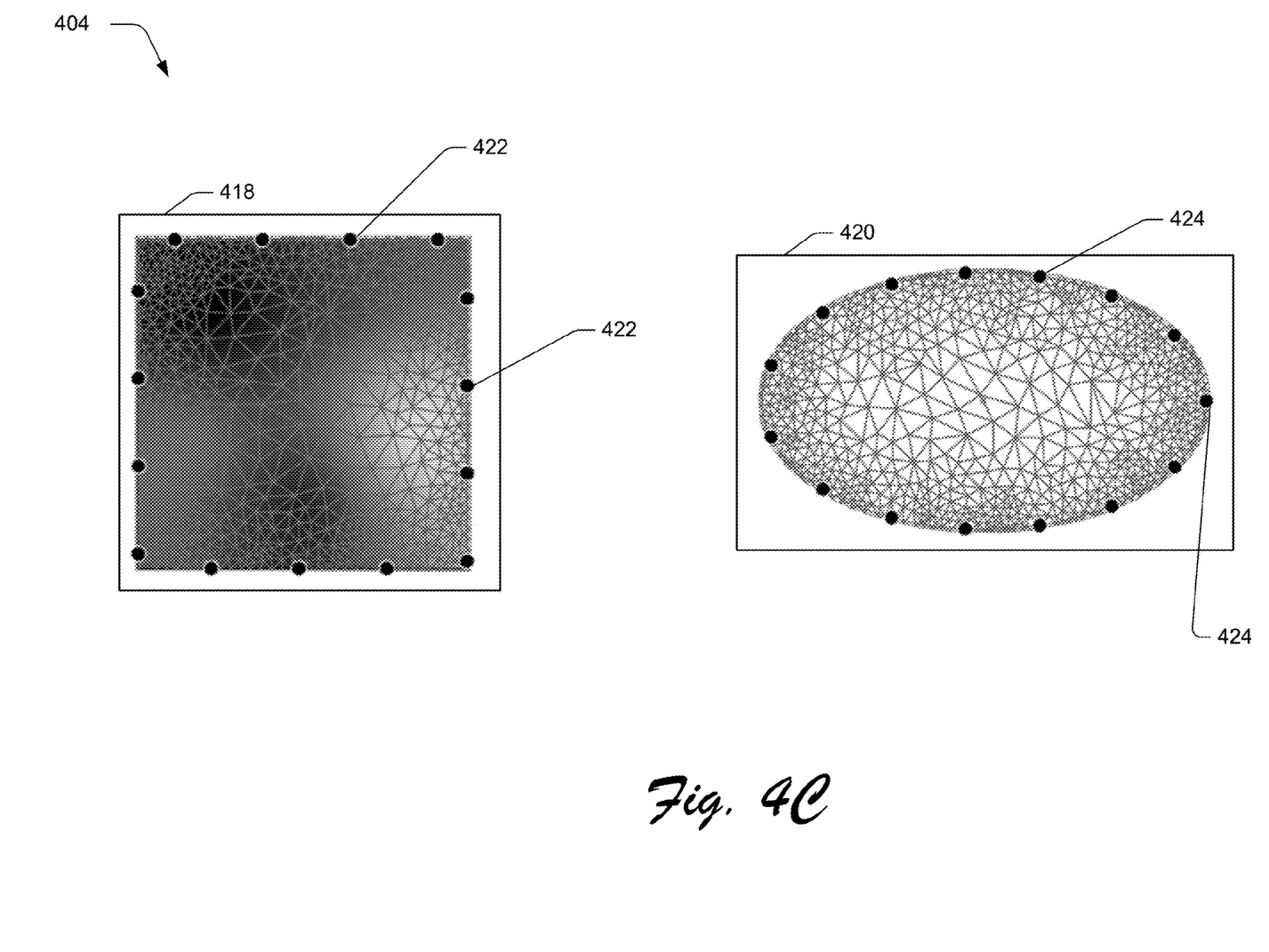
Figure 4D:
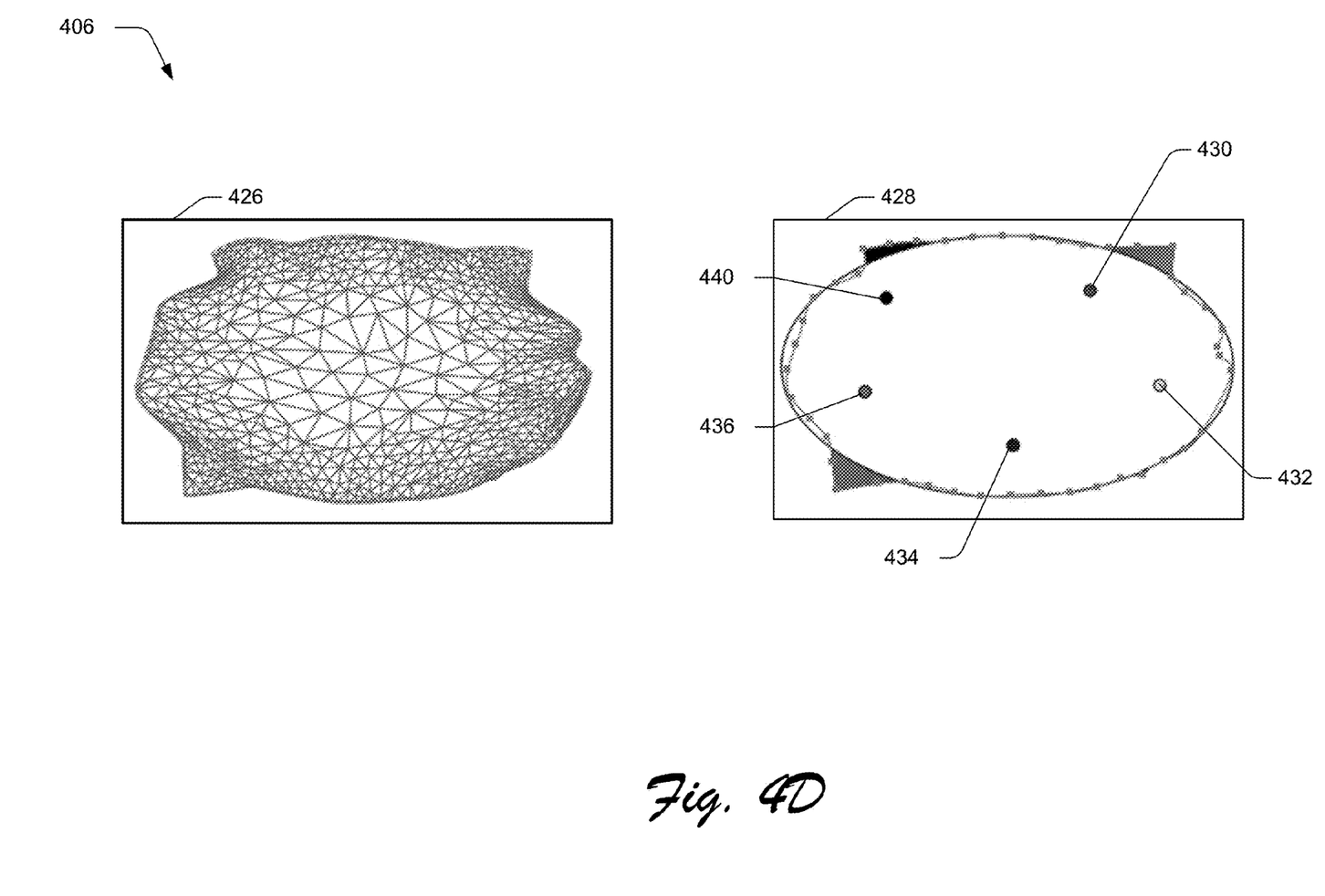

FIGS. 4A, 4B, 4C, 4D, and 4E are illustrations depicting an example representation in which a style of a freeform gradient of a source geometry is transferred to a target geometry. FIG. 4A depicts an illustration of an example representation 400 of an object having a freeform gradient style of a source geometry to be transferred, and an additional object having a target geometry to receive the transferred style. FIG. 4B depicts an illustration of an example representation 402 of anchor points added to the source geometry and anchor points added to the target geometry. FIG. 4C depicts an illustration of an example representation 404 of source mesh handles added to a source mesh of the source geometry and target mesh handles added to a target mesh of the target geometry. FIG. 4D depicts an illustration of an example representation 406 of a warped source mesh and mapped and/or warped color point positions. FIG. 4E illustrates an example representation 408 of a freeform gradient style transfer from the source geometry of the object to the target geometry of the additional object.

Representation 400 is illustrated to include a freeform gradient of a source geometry of a source object 410 as well as a target geometry of an additional object 412. As shown in FIG. 4A, the geometry of the source object 410 is generally square and the geometry of the additional object 412 is generally an ellipse. Additionally, the freeform gradient of the source geometry has a distinct style which is defined by colors and orientations of color point locations within the source geometry. The techniques described herein can transfer the freeform gradient from the square geometry of the object 410 to the ellipse geometry of the additional object 412 while preserving the style of the freeform gradient of the object 410.

Representation 402 is also illustrated to include the freeform gradient of the source geometry of the source object 410 and the target geometry of the additional object 412. As shown in FIG. 4B, a plurality of anchor points 414 are added to the source geometry and a plurality of anchor points 416 are added to the target geometry. Addition of anchor points 414 and 416 ensures a precise deformation of the source geometry because the additional anchor points will add additional segments to meshes as illustrated in FIG. 4C. In an example, the number of anchor points 414 of the source geometry is the same as the number of anchor points 416 of the target geometry to facilitate one-to-one correspondence between the meshes shown in FIG. 4C.

Representation 404 is illustrated to include a source mesh 418 of the source geometry and a target mesh 420 of the target geometry. As shown in FIG. 4C, source mesh handles 422 have been added to the boundary of the source mesh 418 and target mesh handles 424 have been added to the boundary of the target mesh 420. In one example, the number of source mesh handles 422 of the source mesh 418 is the same as the number of target mesh handles 424 of the target mesh 420 to facilitate one-to-one mapping of the source mesh handles 422 to the target mesh handles 424.

Representation 406 includes a warped source mesh 426 and mapped color point locations 428. As shown in FIG. 4D, the warped mesh 426 is the source mesh 418 deformed based on mapping the source mesh handles 422 to the target mesh handles 424. In this way, the warped mesh 426 is representative of the source geometry of the source object 410 warped to appear as the target geometry of the additional object 112. The mapped color point locations 428 include color point locations 430-440 which have been mapped from the color point locations of the source mesh 418 to the warped source mesh 426. By mapping the color point locations 228 to the warped mesh 426 which resembles the target geometry of the additional object 412, the style of the freeform gradient of the source geometry of the object 410 is transferred to the target geometry of the additional object 412. This is illustrated by representation 408 which includes the freeform gradient of the source geometry of the source object 410 which has a freeform gradient style and a freeform gradient of the target geometry of the additional object 442 which also has the freeform gradient style.

Figure 5:
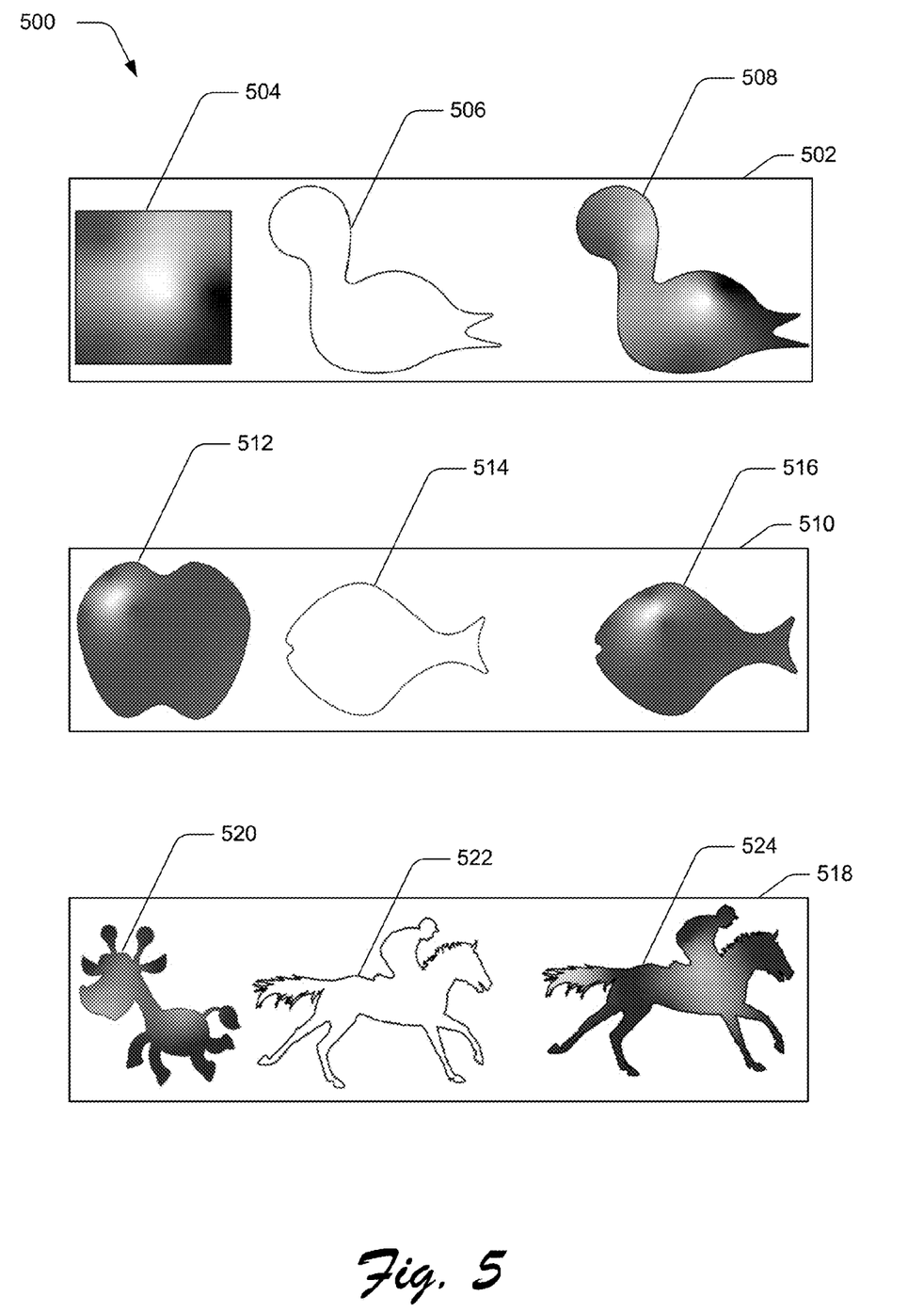
FIG. 5 is an illustration depicting three example representations of freeform gradient style transfer.

FIG. 5 is an illustration 500 depicting three example representations of freeform gradient style transfer. A first example 502 is illustrated to include a freeform gradient of a source geometry 504 having a first style and a target geometry 506 to receive a freeform gradient having the first style. In this example, the source geometry 504 is generally a square shape and the target geometry 506 resembles a shape of a sitting bird. As shown in FIG. 5, the target geometry 507 receives a freeform gradient having the first style which is illustrated as freeform gradient style transfer 508 in example 502.

A second example 510 is also is illustrated to include a freeform gradient of a source geometry 512 having a second style and a target geometry 514 to receive a freeform gradient having the second style. In this second example, the source geometry 512 resembles the shape of an apple and the target geometry 514 resembles the shape of a fish. As shown in FIG. 5, the target geometry 514 receives a freeform gradient having the second style which is illustrated as freeform gradient style transfer 516 in example 510.

A third example 518 is also is illustrated to include a freeform gradient of a source geometry 520 having a third style and a target geometry 522 to receive a freeform gradient having the third style. In this third example, the source geometry 520 resembles the shape of a cow and the target geometry 522 resembles the shape of a jockey riding a horse. As shown in FIG. 5, the target geometry 522 receives a freeform gradient having the third style which is illustrated as freeform gradient style transfer 524 in example 518.

Although, these examples have been described in terms of freeform gradient style transfer from a source geometry to a target geometry, the described systems and techniques are further capable of applying a freeform gradient style from a reusable digital asset any target geometry. In this way, the described systems are capable of implementing a style of a freeform gradient as a reusable digital asset which can be applied to any geometry of a digital object. This eliminates the tedious effort involved in recreating the style of the freeform gradient each time the style is applied to a geometry of an object, and the reusable digital asset can be modified to modify the style of freeform gradients applied to many geometries of objects automatically. By way of example, the freeform gradient of the source geometry 504 having a first style can be a reusable digital asset that is capable of applying the first style to the target geometry 514 or the target geometry 522. In this manner, the freeform gradient of the source geometry 512 having the second style can be saved as a digital asset which is usable to apply the second style to the target geometry 506 or the target geometry 522. Similarly, the freeform gradient of the source geometry 520 having the third style can be saved as a digital asset which is usable to apply the third style to the target geometry 506 or the target geometry 514.

Example System and Device

Figure 6:
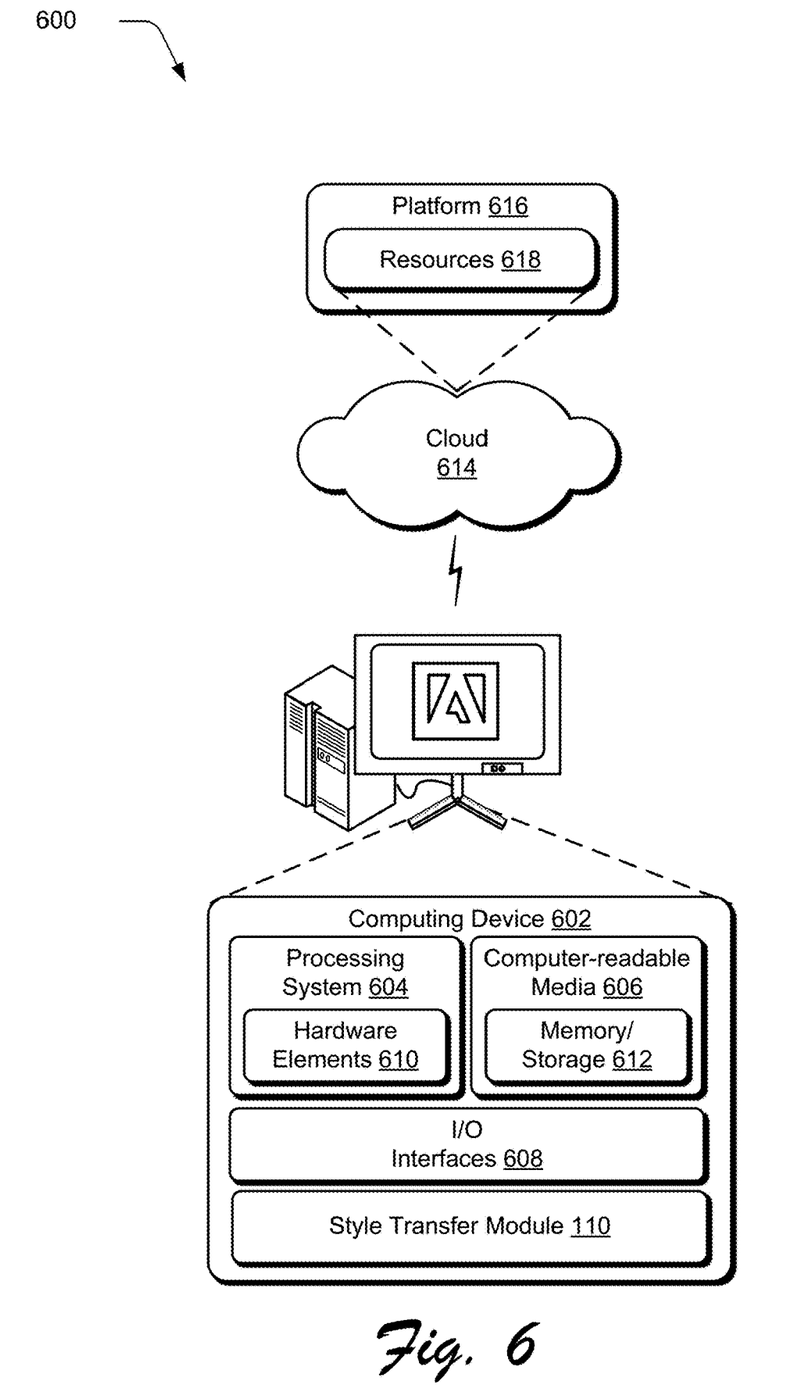
FIG. 6 illustrates an example system that includes an example computing device that is representative of one or more computing systems and/or devices that may implement the various techniques described herein.

FIG. 6 illustrates an example system 600 that includes an example computing device that is representative of one or more computing systems and/or devices that may implement the various techniques described herein. This is illustrated through inclusion of the style transfer module 110. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

100581 "Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources 618 and functions to connect the computing device 602 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the implementation of freeform gradient style transfer has been described in language specific to structural features and/or methods, it is to be understood that the appended claims are not necessarily limited to the specific features or methods described. Rather, the specific features and methods are disclosed as example implementations freeform gradient style transfer, and other equivalent features and methods are intended to be within the scope of the appended claims. Further, various different examples are described and it is to be appreciated that each described example can be implemented independently or in connection with one or more other described examples.

What is claimed is:

1. In a digital medium environment to transfer a style of a freeform gradient of a source geometry to a target geometry, a method implemented by a computing device, the method comprising:
   generating, by the computing device, source mesh handles on a boundary of a source mesh of the source geometry, the source mesh including color point locations of the freeform gradient;
   generating, by the computing device, target mesh handles on a boundary of a target mesh of the target geometry;
   mapping, by the computing device, the source mesh handles to the target mesh handles by coinciding a geometric center of the source geometry and a geometric center of the target geometry;
   warping, by the computing device, the source mesh and the color point locations based on the mapping to generate a freeform gradient of the target geometry having the style; and
   rendering, by the computing device, the freeform gradient of the target geometry having the style in a user interface.

2. The method as described in claim 1, further comprising:
   adding a plurality of anchor points to the source geometry wherein the source geometry and the target geometry have a same number of anchor points; and
   generating the source mesh of the source geometry.

3. The method as described in claim 1, wherein the mapping is a one-to-one mapping.

4. The method as described in claim 1, further comprising mapping the color point locations from the source mesh to the target mesh.

5. The method as described in claim 1, wherein the freeform gradient of the source geometry is a digital asset that is reusable to transfer the style to an additional target geometry.

6. The method as described in claim 1, wherein the source mesh handles are evenly distributed around the boundary of the source mesh.

7. The method as described in claim 1, further comprising preserving vertex indices of the source mesh, the vertex indices corresponding the color point locations for mapping the color point locations from the vertex indices to the target mesh.

8. The method as described in claim 1, further comprising:
   sampling points around the boundary of the source mesh; and
   using the points to add the source mesh handles to the source mesh.

9. The method as described in claim 1, wherein a number of source mesh handles is equal to a number of target mesh handles.

10. In a digital medium environment to transfer a style of a freeform gradient of a source geometry to a target geometry, a system comprising:
    a mesh handle module implemented to:
      add source mesh handles to a source mesh of the source geometry, the source mesh including color point locations of the freeform gradient; and
      add target mesh handles to a target mesh of the target geometry;
    a mapping module implemented to map the source mesh handles to the target mesh handles by coinciding a geometric center of the source geometry and a geometric center of the target geometry; and
    a warping module implemented to warp the source mesh and the color point locations based on the mapping to generate a freeform gradient of the target geometry having the style.

11. The system as described in claim 10, further comprising a meshing module implemented to:
    add a plurality of anchor points to the source geometry wherein the source geometry and the target geometry have a same number of anchor points; and
    generate the source mesh of the source geometry.

12. The system as described in claim 10, wherein the mapping module is implemented to map the color point locations from the source mesh to the target mesh.

13. The system as described in claim 10, wherein the freeform gradient of the source geometry is a digital asset that is reusable to transfer the style to an additional target geometry.

14. The system as described in claim 10, wherein the mesh handle module is implemented to:
    sample points around the boundary of the source mesh; and
    use the points to add the source mesh handles to the source mesh.

15. The system as described in claim 10, wherein a number of source mesh handles is equal to a number of target mesh handles.

16. In a digital medium environment to transfer a style of a freeform gradient of a source geometry to a target geometry, a system comprising:
    means for mapping source mesh handles of a source mesh of the source geometry to target mesh handles of a target mesh of the target geometry;
    means for warping the source mesh to the target geometry using the target mesh handles;
    means for mapping color point locations of the freeform gradient to the target mesh based on the warping; and
    means for generating a freeform gradient of the target geometry having the style.

17. The system as described in claim 16, wherein the freeform gradient of the source geometry is a digital asset that is reusable to transfer the style to an additional target geometry.

18. The system as described in claim 16, further comprising means for adding a plurality of anchor points to the source geometry wherein the source geometry and the target geometry have a same number of anchor points.

19. The system as described in claim 16, wherein a number of source mesh handles is equal to a number of target mesh handles.

20. The system as described in claim 16, further comprising:
   means for sampling points around the boundary of the source mesh; and
   means for using the points to add the source mesh handles to the source mesh.

* * * * *